(12) United States Patent
Takahashi et al.

(10) Patent No.: US 11,788,752 B2
(45) Date of Patent: Oct. 17, 2023

(54) POWER SOURCE QUALITY MANAGEMENT SYSTEM AND AIR CONDITIONING APPARATUS

(71) Applicant: DAIKIN INDUSTRIES, LTD., Osaka (JP)

(72) Inventors: Jun Takahashi, Osaka (JP); Masaki Kono, Osaka (JP); Reiji Kawashima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 44 days.

(21) Appl. No.: 17/035,090

(22) Filed: Sep. 28, 2020

(65) Prior Publication Data

US 2021/0010707 A1 Jan. 14, 2021

Related U.S. Application Data

(63) Continuation of application No. PCT/JP2019/005062, filed on Feb. 13, 2019.

(30) Foreign Application Priority Data

Mar. 29, 2018 (JP) .................................. 2018-064372

(51) Int. Cl.
*F24F 1/38* (2011.01)
*F24F 11/38* (2018.01)
(Continued)

(52) U.S. Cl.
CPC .............. *F24F 11/38* (2018.01); *F24F 11/88* (2018.01); *F24F 2140/60* (2018.01)

(58) Field of Classification Search
CPC ........ F24F 11/38; F24F 11/88; F24F 2140/60; H02J 2310/14; H02J 3/1892; H02J 3/1842;
(Continued)

(56) References Cited

U.S. PATENT DOCUMENTS

| 5,793,623 A | * | 8/1998 | Kawashima | ...... H02M 7/53873 |
| | | | | 363/56.05 |
| 2014/0167526 A1 | | 6/2014 | Sirajuddin | |
| 2017/0237334 A1 | * | 8/2017 | Kawashima | .............. H02J 3/01 |
| | | | | 363/44 |

FOREIGN PATENT DOCUMENTS

| EP | 0 695 024 A2 | 1/1996 |
| GB | 1322586 A | 7/1973 |

(Continued)

OTHER PUBLICATIONS

Extended European Search Report for European Application No. 19775245.4, dated Dec. 8, 2021.
(Continued)

*Primary Examiner* — Santosh R Poudel
(74) *Attorney, Agent, or Firm* — Birch, Stewart, Kolasch & Birch, LLP

(57) ABSTRACT

A power conversion device (3) is supplied with an electric power from an alternating current power source (1). An active filter device (2), which is a power source quality improvement unit, improves a quality of the alternating current power source (1). A controller (37) limits an operation of the power conversion device (3) so that any one of a power-source electric power, a power-source current, and a power-source harmonic obtained when a failure detection unit (4) detects a failure of the active filter device (2) becomes less than or equal to a maximum value of a corresponding one of the power-source electric power, the power-source current, and the power-source harmonic, the maximum value being obtained when no failure has occurred in the active filter device (2).

20 Claims, 8 Drawing Sheets

(51) Int. Cl.
*F24F 11/88* (2018.01)
*F24F 140/60* (2018.01)

(58) Field of Classification Search
CPC ... Y02B 70/3225; Y02E 40/20; Y04S 20/222; H02M 1/12; H02M 7/12; H02M 7/48
See application file for complete search history.

(56) References Cited

FOREIGN PATENT DOCUMENTS

| | | | | |
|---|---|---|---|---|
| JP | 4-12668 A | | 1/1992 | |
| JP | 4-117171 A | | 4/1992 | |
| JP | H05199795 A | * | 8/1993 | .......... F25B 2600/00 |
| JP | 7-5942 A | | 1/1995 | |
| JP | 7-115772 A | | 5/1995 | |
| JP | H0833392 A | * | 2/1996 | ........... Y02B 70/126 |
| JP | 9-200956 A | | 7/1997 | |
| JP | 11-75363 A | | 3/1999 | |
| JP | 2002-165386 A | | 6/2002 | |
| JP | 2010-193646 A | | 9/2010 | |
| JP | 2010193646 A | * | 9/2010 | |
| JP | 5342528 B2 | | 11/2013 | |
| JP | 2016067079 A | * | 4/2016 | |
| JP | 2016185058 A | * | 10/2016 | ................ H02J 3/01 |
| JP | 2017085789 A | * | 5/2017 | |

OTHER PUBLICATIONS

International Search Report, issued in PCT/JP2019/0005062, PCT/ISA/210, dated Mar. 19, 2019.

* cited by examiner

POWER SOURCE QUALITY MANAGEMENT SYSTEM AND AIR CONDITIONING APPARATUS

CROSS REFERENCE TO RELATED APPLICATIONS

This application is a Continuation of PCT International Application No. PCT/JP2019/005062 filed on Feb. 13, 2019, which claims priority under 35 U.S.C. § 119(a) to Patent Application No. 2018-064372 filed in Japan on Mar. 29, 2018, all of which are hereby expressly incorporated by reference into the present application.

TECHNICAL FIELD

The present disclosure relates to a power source quality management system and an air conditioning apparatus.

BACKGROUND ART

An air conditioning apparatus and the like are provided with a power source quality improvement device (harmonic suppression device) such as an active filter to prevent a power-source harmonic current from flowing to an electric power system (for example, an electric power system including a commercial power source). The power source quality improvement device makes the waveform of a power-source current from a power source substantially sinusoidal to improve a power-source power factor. This can reduce the sizes and capacities of power receiving facilities such as power source transformers, lines, breakers, and fuses.

A technique related to the power source quality improvement device described above is disclosed in PTL 1, in which if a power source quality improvement device (active filter) in an air conditioning apparatus has failed, the operation of a compressor is continued.

CITATION LIST

Patent Literature

PTL 1: Japanese Patent No. 5342528

SUMMARY

A first aspect of the present disclosure is a power source quality management system including a load apparatus (70A, 70B, 7, 70, 9A, 9B) that operates in response to a power-source electric power being supplied thereto from a power source (1); a power source quality improvement unit (2, 8) that is connected to the power source (1) and improves a quality of the power source (1); a failure determination unit (4, 41) that determines a presence or absence of a failure of the power source quality improvement unit (2, 8); and an operation limiting unit (37A, 37B, 37, 75, 95A, 95B) that limits an operation of the load apparatus (70A, 70B, 7, 70, 9A, 9B) so that when the failure determination unit (4, 41) determines that the power source quality improvement unit (2, 8) has failed, any one of the power-source electric power, a power-source current, and a power-source harmonic becomes less than or equal to a maximum value of a corresponding one of the power-source electric power, the power-source current, and the power-source harmonic, the maximum value being obtained when no failure has occurred in the power source quality improvement unit (2, 8).

DESCRIPTION OF EMBODIMENTS

Embodiment 1

<Overview>

Figure 1:
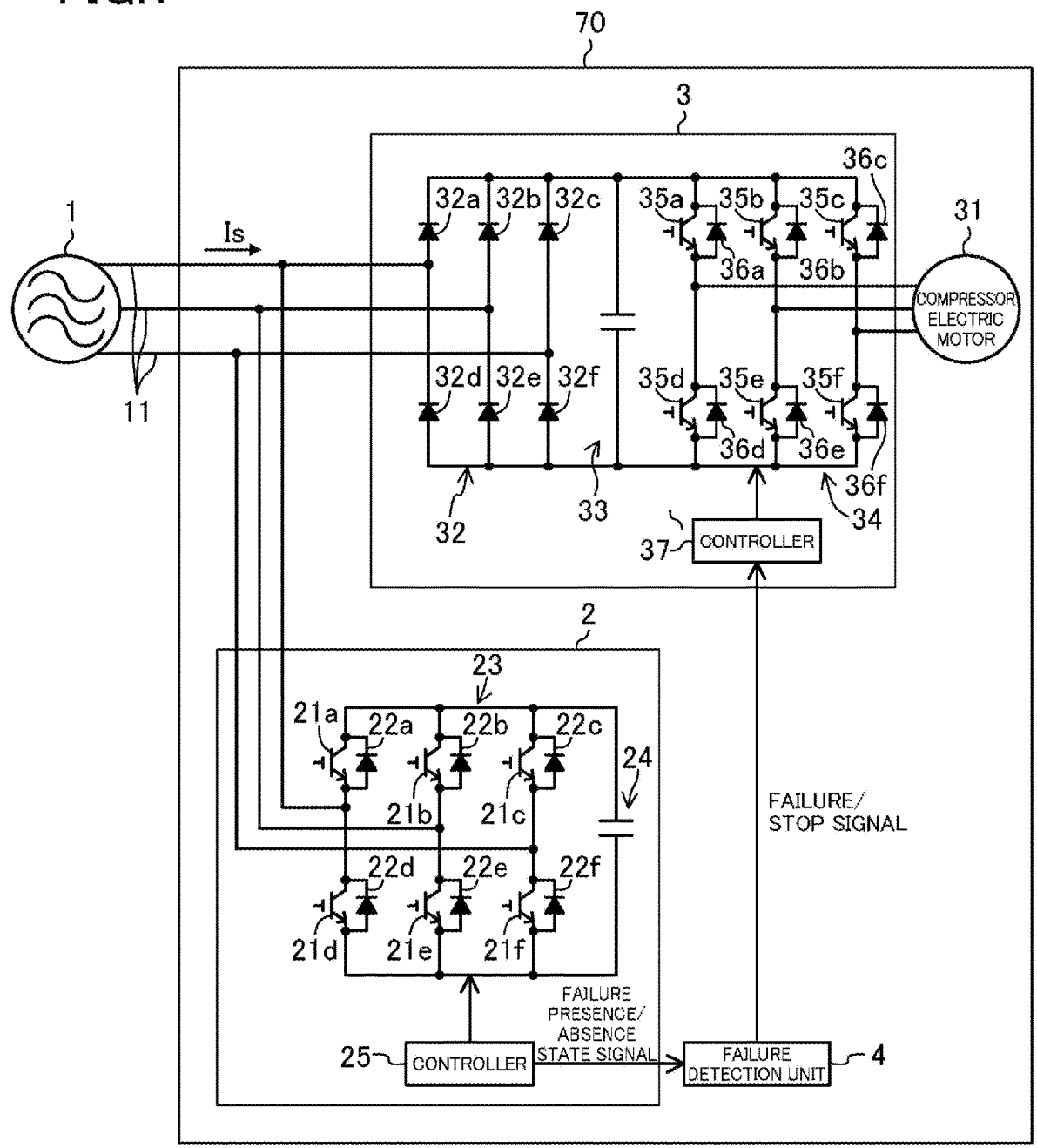
FIG. 1 is a block diagram illustrating a configuration of an air conditioning apparatus according to Embodiment 1.

FIG. 1 is a block diagram illustrating a configuration of an air conditioning apparatus (70) according to Embodiment 1. The air conditioning apparatus (70) is installed in an apartment, a factory, a building, or a house (hereinafter, building or the like) to perform air conditioning (cooling or heating) in an indoor space.

The air conditioning apparatus (70) is supplied with a power-source electric power, which is alternating current, from an electric power system including an alternating current power source (1) via lines (11). The power-source electric power activates the air conditioning apparatus (70).

By way of example, the alternating current power source (1) is a three-phase alternating current power source (for example, a three-phase commercial power source).

Although not illustrated, the building or the like is provided with a distribution switchboard, which is connected to the alternating current power source (1) and configured to receive a power-source electric power from the alternating current power source (1). The distribution switchboard includes a breaker, and the power-source electric power from the alternating current power source (1) is distributed to the air conditioning apparatus (70) via the breaker.

The respective capacities of the breaker, the alternating current power source (1), and the lines (11) are determined by the power-source power factor. In Embodiment 1, the air conditioning apparatus (70) includes an active filter device (2) serving as a power source quality improvement unit, and the alternating current power source (1) has a relatively high power-source power factor. Accordingly, the respective capacities of the breaker, the alternating current power source (1), and the lines (11) are set to be lower than those when the active filter device (2) is not disposed.

<Configuration of Air Conditioning Apparatus>

The air conditioning apparatus (70) includes a refrigerant circuit (not illustrated) having a compressor and the like, a power conversion device (3) serving as a harmonic generation load device (corresponding to a harmonic generation unit), the active filter device (2), a failure detection unit (4) corresponding to a failure determination unit, and a controller (37) serving as an operation limiting unit.

Embodiment 1 exemplifies a case where the controller (37) is incorporated in the power conversion device (3).

—Power Conversion Device—

The power conversion device (3) is connected to the alternating current power source (1) via the lines (11). In response to a power-source electric power being supplied from the alternating current power source (1), the power conversion device (3) converts the power-source electric power into an alternating current electric power having a desired frequency and a desired voltage and supplies the alternating current electric power obtained as a result of conversion to the compressor (more specifically, a compressor electric motor (31)) as a power-source electric power. Accordingly, the compressor is activated, and the refrigerant circuit functions, resulting in an indoor space being air-conditioned.

Specifically, the power conversion device (3) includes a rectifier circuit (32) constituted by six diodes (32a to 320, a smoothing capacitor (33), an inverter circuit (34) constituted by switching elements (35a to 35f) and freewheeling diodes (36a to 36f), and the controller (37) constituted by a CPU and the like.

In the air conditioning apparatus (70), when the power conversion device (3) or the compressor electric motor (31) is activated, a harmonic current caused by a power-source harmonic may be generated. That is, the power conversion device (3) can be a source from which a power-source harmonic is generated. The harmonic current can flow to the alternating current power source (1) via a path for a current flow (hereinafter, power receiving paths (11)) to the air conditioning apparatus (70). The harmonic current is typically restricted in the level of outflow to the alternating current power source (1) side. In the air conditioning apparatus (70) according to Embodiment 1, therefore, the active filter device (2), which is a power source quality improvement unit, reduces the harmonic current. In addition, to address a demand for improvement in a fundamental power factor at a power distribution end and a power receiving end or a total power factor that also takes into account harmonics in view of facility capacity, energy saving, and so on, the active filter device (2) of Embodiment 1 has a function of improving the fundamental power factor and the total power factor.

—Controller—

The controller (37) controls the switching elements (35a to 35f) to be turned on or off. In particular, the controller (37) according to Embodiment 1 functions as an operation limiting unit and performs control to limit the operation of the compressor electric motor (31) at the time of failure of the active filter device (2). The details will be described in the "<Regarding Operation Limit Control>" section.

—Active Filter Device—

The active filter device (2) is contained in the air conditioning apparatus (70), or incorporated in the air conditioning apparatus (70).

The active filter device (2) has a function of canceling the harmonic current flowing out of the power conversion device (3) and appearing in the power receiving paths (11) of the power conversion device (3). That is, the active filter device (2) causes a compensation current to flow so as to make the waveform of a power-source current (Is) flowing through the power receiving paths (11) close to a sinusoidal waveform. More specifically, the active filter device (2) detects a harmonic current appearing in the power receiving paths (11), generates a compensation current having a phase opposite to that of the detected harmonic current, and supplies the compensation current to the power receiving paths (11).

The active filter device (2) causes the compensation current described above to flow to improve a fundamental power factor. In this example, the active filter device (2) is configured to cause a compensation current that also compensates for the reactive component of the fundamental to flow to improve a fundamental power factor or a total power factor that also takes into account harmonics. Accordingly, the active filter device (2) can have a function of improving the quality of the alternating current power source (1).

The active filter device (2) having the configuration described above is connected in parallel with the power conversion device (3) with respect to the alternating current power source (1). Specifically, the active filter device (2) includes a current source (23) having six switching elements (21a to 21f) and freewheeling diodes (22a to 220, a capacitor (24), and a controller (25) constituted by a CPU and the like and configured to control the switching elements (21a to 21f) to be turned on or off.

It is considered that the harmonic current generated in the air conditioning apparatus (70) is the largest when the load on the air conditioning apparatus (70) is the largest (for example, at the time of maximum output in cooling operation). Accordingly, typically, the capability (the magnitude of electric power that can be generated), that is, the capacity, of the active filter device (2) is set by taking into account the harmonic current that is generated at the time of maximum load on the air conditioning apparatus (70). That is, the capacity of the alternating current power source (1), the capacity of the lines (11), and so on are designed in accordance with the power-source current (Is) obtained at the time of maximum load on the air conditioning apparatus (70).

—Failure Detection Unit—

The failure detection unit (4) is connected to the controller (25) of the active filter device (2) and to the controller (37) of the power conversion device (3).

The failure detection unit (4) is, for example, a microcomputer constituted by a CPU, a memory, and so on, and receives a failure presence/absence state signal from the controller (25) of the active filter device (2). The signal is a signal used by the failure detection unit (4) to determine whether the active filter device (2) has failed, and is sequentially output from the controller (25) by monitoring the state of the current source (23) and the like by using the controller (25).

When the failure detection unit (4) detects the presence or absence of a failure in accordance with the signal input thereto, the failure detection unit (4) outputs a failure/stop signal indicating a detection result (i.e., the presence or absence of a failure of the active filter device (2)) to the controller (37) of the power conversion device (3).

<Regarding Operation Limit Control>

Due to the presence of the active filter device (2) described above, the value of the power-source power factor, which is related to the power source voltage and the power-source current of the alternating current power source (1), is relatively high. In Embodiment 1, therefore, the reactive power is decreased compared with the case where the active filter device (2) is not present, advantageously resulting in a decrease in the input electric power (i.e., power-source electric power) of the air conditioning apparatus (70) and a decrease in the input current (i.e., power-source current) of the air conditioning apparatus (70).

However, if the active filter device (2) has failed, furthermore, if the active filter device (2) has stopped operation due to the failure, the power-source power factor of the alternating current power source (1) is lower than that when the active filter device (2) is in normal operation. Thus, if the active filter device (2) has failed, the power-source current (input current) (Is) obtained at the time of maximum load on the air conditioning apparatus (70) becomes larger than that when the active filter device (2) is in normal state, and may exceed the capacity of the alternating current power source (1), the capacity of the lines (11), or the like.

Accordingly, if the active filter device (2) has failed, the controller (37) of the power conversion device (3) according to Embodiment 1 limits the driving of the compressor electric motor (31) whose drive source is the power conversion device (3) to perform operation limit control to limit the operation of the compressor.

Specifically, in a state where the active filter device (2) has failed or in a state where the active filter device (2) has stopped operation due to the failure, a failure presence/absence state signal indicating the state is output from the controller (25) of the active filter device (2) to the failure detection unit (4). In accordance with the failure presence/absence state signal, the failure detection unit (4) detects a failure of the active filter device (2) or detects stopping of the operation of the active filter device (2) due to the failure. The failure detection unit (4) generates a failure/stop signal indicating the detection result and outputs the failure/stop signal to the controller (37) of the power conversion device (3).

Upon receipt of the failure/stop signal, the controller (37) performs control to limit the operation of the power conversion device (3) so that the power-source current (Is) (i.e., the power-source current (Is) obtained when the active filter device (2) has failed) becomes less than or equal to a maximum value of the power-source current (Is), which is obtained in the state where the active filter device (2) is operating without failure, to limit the operation of the compressor electric motor (31). Alternatively, the controller (37) performs control to limit the operation of the power conversion device (3) so that a power-source electric power (i.e., the power-source electric power obtained when the active filter device (2) has failed) becomes less than or equal to a maximum value of the power-source electric power, which is obtained in the state where the active filter device (2) is operating without failure, to limit the operation of the compressor electric motor (31). As an example, the controller (37) reduces the frequency of the alternating current electric power to be output from the power conversion device (3) to the compressor electric motor (31) to reduce the rotational speed of the compressor electric motor (31), or stops the power conversion device (3) from outputting the alternating current electric power to stop the rotation of the compressor electric motor (31).

That is, the controller (37) limits the operation of the power conversion device (3) so that the power-source current (Is) or the power-source electric power obtained in the state where the active filter device (2) has failed does not exceed its maximum value. This reduces the occurrence of a phenomenon in which the power-source electric power or the like exceeds the capacity of the alternating current power source (1), the capacity of the lines (11), or the like.

When the active filter device (2) is in normal operation, a failure presence/absence state signal indicating the normal operation of the active filter device (2) may be output from the controller (25) to the failure detection unit (4). In this case, the failure detection unit (4) may not output a failure/stop signal to the controller (37) of the power conversion device (3), or may output to the controller (37) a failure/stop signal indicating that the active filter device (2) is operating in normal state. In such a case, the controller (37) of the power conversion device (3) does not perform the operation limit control described above.

<Advantages>

In Embodiment 1, through the operation limit control described above, the power-source electric power or the like obtained when the active filter device (2) has failed does not exceed a maximum value of the power-source electric power or the like, which is obtained when the active filter device (2) is in normal state. This can prevent the power-source electric power or the like obtained when the active filter device (2) has failed from exceeding the capacity of power receiving facilities (specifically, the alternating current power source (1), the lines (11), and the breaker). Therefore, it is possible to reduce damage and burnout of the power receiving facilities described above at the time of failure of the active filter device (2).

Embodiment 2

Embodiment 2 exemplifies a case where the power source quality improvement unit is a PWM converter device (5) that assists in improving a power-source harmonic, and where the harmonic generation unit is an inverter device (6).

<Configuration of Air Conditioning Apparatus>

Figure 2:
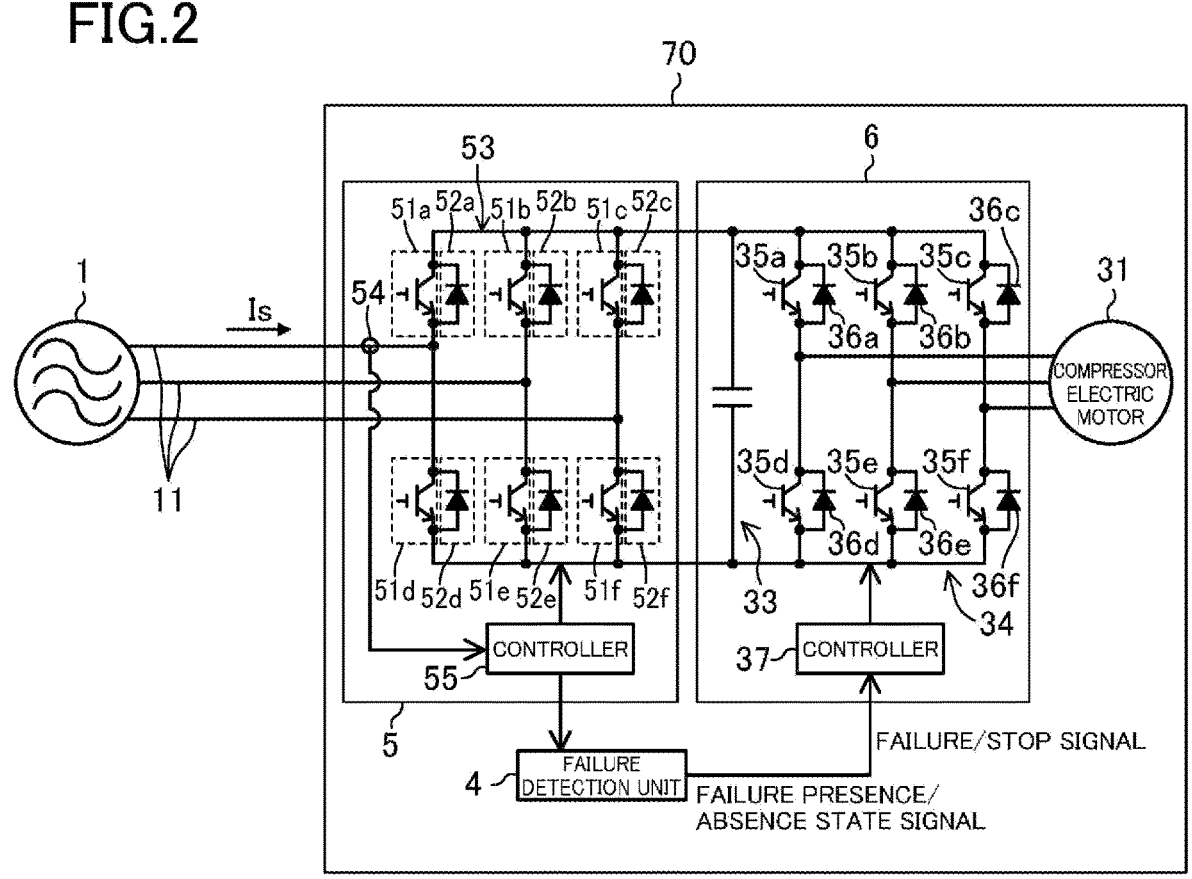
FIG. 2 is a block diagram illustrating a configuration of an air conditioning apparatus according to Embodiment 2.

FIG. 2 is a block diagram illustrating an air conditioning apparatus (70) according to Embodiment 2. The air conditioning apparatus (70) is connected to an alternating current power source (1) and includes, in addition to a failure detection unit (4) similar to that in Embodiment 1, an inverter device (6) serving as a harmonic generation unit, a controller (37) included in the inverter device (6) and functioning as an operation limiting unit, a PWM converter device (5) serving as a power source quality improvement unit, and a refrigerant circuit (not illustrated) having a compressor and the like.

The inverter device (6) is configured such that the rectifier circuit (32) is removed from the power conversion device (3) of Embodiment 1. In FIG. 2, main elements included in the inverter device (6) are given the same numerals as those in FIG. 1.

The PWM converter device (5) is contained in the air conditioning apparatus (70), or incorporated in the air conditioning apparatus (70). The PWM converter device (5) is a device that switches switching elements (51a to 51f) at high speeds to make the waveform of a power-source current (Is) serving as an input current substantially sinusoidal to suppress a power-source harmonic and improve the power-source power factor. Accordingly, like the active filter device (2) according to Embodiment 1, the PWM converter device (5) has a function of improving the quality of the alternating current power source (1).

The PWM converter device (5) having the configuration described above is connected in series with the inverter device (6) with respect to the alternating current power source (1). Specifically, the PWM converter device (5) includes a converter circuit (53) constituted by six switching elements (51a to 51f) and freewheeling diodes (52a to 52f), a current sensor (54), and a controller (55) constituted by a CPU and the like and configured to control the switching elements (51a to 51f) to be turned on or off <Regarding Operation Limit Control>

In the PWM converter device (5), even if the switching elements (51a to 51f) or the current sensor (54) has failed, a current can flow to the inverter device (6) via the freewheeling diodes (52a to 52o) if the freewheeling diodes (52a to 52o) do not fail. Accordingly, even if the PWM converter device (5) has failed, the inverter device (6) can continue the operation of the compressor by driving the compressor electric motor (31), and therefore the air conditioning apparatus (70) can continue operation.

As an example, if only the current sensor (54) has failed, the PWM converter device (5) is unable to perform a switching operation of the switching elements (51a to 51f) in accordance with a detection result of the current sensor (54), and thus it is not possible to improve a power-source power factor. However, if the switching elements (51a to 51f) or the freewheeling diodes (52a to 52o) are in normal state, the PWM converter device (5) itself can operate.

However, as described above, if the PWM converter device (5) has failed, furthermore, if the PWM converter device (5) has stopped operation due to the failure, the power-source power factor is reduced compared with that when the PWM converter device (5) is in normal operation. Accordingly, the power-source current (Is), which is an input current at the time of maximum load on the air conditioning apparatus (70), is larger than that when no failure has occurred in the PWM converter device (5), and can exceed the capacity of the alternating current power source (1) or the capacity of the lines (11).

In Embodiment 2, accordingly, if the PWM converter device (5) has failed or has stopped operation due to the failure, a failure presence/absence state signal indicating this state is output from the controller (55) of the PWM converter device (5) to the failure detection unit (4). Upon detection of a failure of the PWM converter device (5) or detection of stopping of the operation of the PWM converter device (5) due to the failure in accordance with the failure presence/absence state signal, the failure detection unit (4) generates a failure/stop signal indicating the detection result, and outputs the failure/stop signal to the controller (37) of the inverter device (6).

Upon receipt of the failure/stop signal, the controller (37) performs control to limit the operation of the inverter device (6) so that the power-source current (Is) becomes less than or equal to a maximum value of the power-source current (Is), which is obtained in the state where the PWM converter device (5) is operating without failure, to limit the operation of the compressor electric motor (31). Alternatively, the controller (37) performs control to limit the operation of the inverter device (6) so that the power-source electric power becomes less than or equal to a maximum value of the power-source electric power, which is obtained in the state where the PWM converter device (5) is operating without failure, to limit the operation of the compressor electric motor (31).

As an example, the controller (37) reduces the frequency of the alternating current electric power to be output from the inverter device (6) to the compressor electric motor (31) to reduce the rotational speed of the compressor electric motor (31), or stops the inverter device (6) from outputting the alternating current electric power to stop the rotation of the compressor electric motor (31).

That is, the controller (37) limits the operation of the inverter device (6) so that the power-source current (Is) or the power-source electric power obtained in the state where the PWM converter device (5) has failed does not exceed its maximum value. This reduces the occurrence of a phenomenon in which the input electric power (i.e., power-source electric power) or the like of the air conditioning apparatus (70), which is a load of the alternating current power source (1), exceeds the capacity of the alternating current power source (1), the capacity of the lines (11), or the like.

When the PWM converter device (5) is in normal operation, a failure presence/absence state signal indicating the normal operation of the PWM converter device (5) may be output from the controller (55) of the PWM converter device (5) to the failure detection unit (4). In this case, the failure detection unit (4) may not output a failure/stop signal to the controller (37) of the inverter device (6), or may output to the controller (37) of the inverter device (6) a failure/stop signal indicating that the PWM converter device (5) is operating in normal state. In such a case, the controller (37) of the inverter device (6) does not perform the operation limit control described above.

<Advantages>

Embodiment 2, in which the power source quality improvement unit is the PWM converter device (5), achieves advantages similar to those of Embodiment 1 described above.

Embodiment 3

Embodiment 3 exemplifies a power source quality management system (100) including, as load apparatuses of an alternating current power source (1), a plurality of air conditioning apparatuses (70A, 70B) that do not include a power source quality improvement unit, such as an active filter device or a PWM converter device, and also including an active filter device (2) serving as a power source quality improvement unit.

<Configuration of Power Source Quality Management System>

Figure 3:
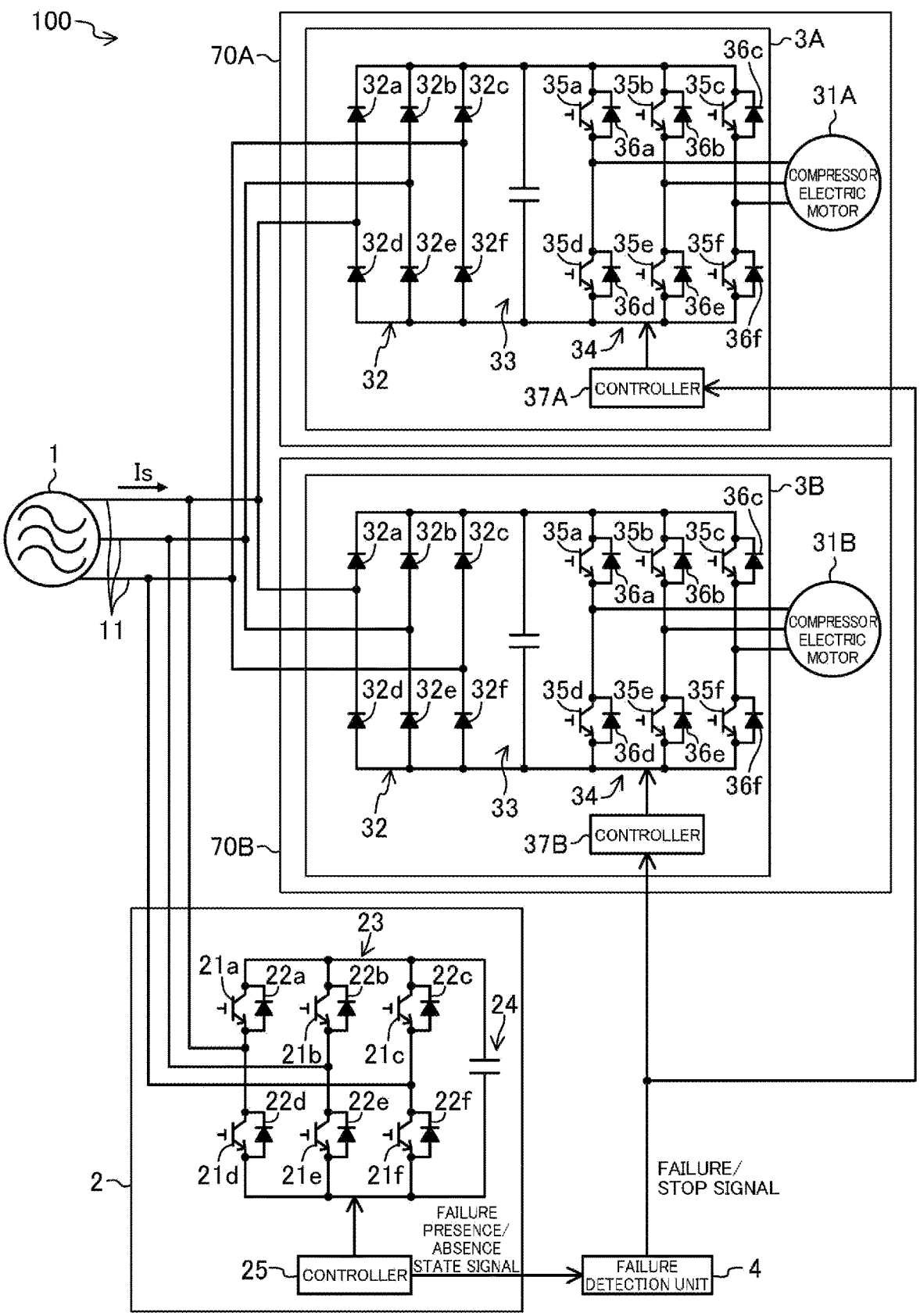
FIG. 3 is a block diagram illustrating a configuration of a power source quality management system according to Embodiment 3.

FIG. 3 is a block diagram illustrating a configuration of the power source quality management system (100) of Embodiment 3.

The power source quality management system (100) includes a plurality of (here, two) air conditioning apparatuses (70A, 70B), an active filter device (2), which is a power source quality improvement unit, a failure detection unit (4), and controllers (37A, 37B) functioning as an operation limiting unit.

The plurality of air conditioning apparatuses (70A, 70B) and the active filter device (2) are connected to the alternating current power source (1) via lines (11) so as to be in parallel with each other with respect to the alternating current power source (1).

The air conditioning apparatuses (70A, 70B) perform an air conditioning operation in response to a power-source electric power being supplied thereto from the alternating current power source (1). Each of the air conditioning apparatuses (70A, 70B) is configured such that the active filter device (2) and the failure detection unit (4) are removed from the air conditioning apparatus (70) according to Embodiment 1. Specifically, each of the air conditioning apparatuses (70A, 70B) includes a refrigerant circuit (not illustrated) having a compressor and the like, and a power conversion device (3A, 3B) serving as a harmonic generation load device (corresponding to a harmonic generation unit). Like the power conversion device (3) according to Embodiment 1 described above, each of the power conversion devices (3A, 3B) includes a rectifier circuit (32), a smoothing capacitor (33), an inverter circuit (34) serving as a harmonic generation unit that generates a power-source harmonic, and a controller (37A, 37B) constituted by a CPU and the like. The rectifier circuits (32), the smoothing capacitors (33), and the inverter circuits (34) are similar to those in Embodiment 1 and are thus given numerals similar to those in Embodiment 1.

The active filter device (2) is connected to the alternating current power source (1) to improve the quality of the alternating current power source (1). The active filter device (2) is not contained in the air conditioning apparatus (70), but is installed in advance in the building or the like described above, with the configuration thereof being similar to that of the active filter device (2) of Embodiment 1 described above. Accordingly, the constituent elements of the active filter device (2) are given numerals similar to those in the Embodiment 1 described above.

The failure detection unit (4) is similar to the failure detection unit (4) according to Embodiment 1 described above. That is, the failure detection unit (4) is connected to the controller (25) of the active filter device (2) and to the controllers (37A, 37B) of the power conversion devices (3A, 3B) and is configured to detect the presence or absence of a failure of the active filter device (2) in accordance with a failure presence/absence state signal from the controller (25).

If the active filter device (2) has failed, the controllers (37A, 37B) of the power conversion devices (3A, 3B) can limit the driving of compressor electric motors (31A, 31B) whose drive sources are the power conversion devices (3A, 3B) to perform operation limit control to limit the operation of the compressor.

While FIG. 3 exemplarily illustrates two air conditioning apparatuses (70A, 70B) and one active filter device (2), the number of air conditioning apparatuses (70A, 70B) and the number of active filter devices (2) are not limited to those in FIG. 3. It is sufficient that two or more air conditioning apparatuses (70A, 70B) and one or more active filter devices (2) be used.

<Regarding Operation Limit Control>

The following describes operation limit control according to Embodiment 3 in detail.

In a state where the active filter device (2) has failed or in a state where the active filter device (2) has stopped operation due to the failure, a failure presence/absence state signal indicating the state is output from the controller (25) of the active filter device (2) to the failure detection unit (4). In accordance with the failure presence/absence state signal, the failure detection unit (4) detects a failure of the active filter device (2) or detects stopping of the operation of the active filter device (2) due to the failure. Upon generation of a failure/stop signal indicating the detection result, the failure detection unit (4) outputs the signal to one of the controllers (37A, 37B) of the power conversion devices (3A, 3B) included in the air conditioning apparatuses (70A, 70B).

As an example, the failure/stop signal is assumed to be input only to the controller (37A). The controller (37A) limits the operation of the air conditioning apparatus (70A) so that the power-source current to be supplied from the alternating current power source (1) to all the load apparatuses of the power source (1) becomes less than or equal to a maximum value of the power-source current, which is obtained in the state where the active filter device (2) is operating without failure. Alternatively, the controller (37A) performs control to limit the operation of the air conditioning apparatus (70A) so that the power-source electric power to be supplied from the alternating current power source (1) to all the load apparatuses of the power source (1) becomes less than or equal to a maximum value of the power-source electric power, which is obtained in the state where the active filter device (2) is operating without failure.

As an example, the controller (37A) reduces the frequency of the alternating current electric power to be output from the power conversion device (3A) to the compressor electric motor (31A) to reduce the rotational speed of the compressor electric motor (31A), or stops the power conversion device (3A) from outputting the alternating current electric power to stop the rotation of the compressor electric motor (31A).

That is, the operation of the air conditioning apparatus (70A) is limited, whereas the operation of the air conditioning apparatus (70B) is continued without limitation. Accordingly, even if the active filter device (2) has failed, the compressor electric motor (31B) is continuously driven. That is, in Embodiment 3, limiting only the operation of either air conditioning apparatus (70A) reduces the occurrence of a phenomenon in which the total electric power of the power source quality management system (100) exceeds the capacity of the alternating current power source (1), the capacity of the lines (11), or the like.

When the active filter device (2) is in normal operation, a failure presence/absence state signal indicating the normal operation of the active filter device (2) may be output from the controller (25) of the active filter device (2) to the failure detection unit (4). In this case, the failure detection unit (4) does not output a failure/stop signal to the controllers (37A, 37B) of the power conversion devices (3A, 3B), and thus the controllers (37A, 37B) do not perform the operation limit control described above.

<Advantages>

In Embodiment 3, through the operation limit control described above, the power-source electric power or the like obtained when the active filter device (2) has failed does not exceed a maximum value of the power-source electric power or the like, which is obtained when the active filter device (2) is in normal state. This can prevent the power-source electric power or the like obtained when the active filter device (2) has failed from exceeding the capacity of power receiving facilities (specifically, the alternating current power source (1), the lines (11), and the breaker). Therefore, it is possible to reduce damage and burnout of the power receiving facilities described above at the time of failure of the active filter device (2).

Embodiment 4

Embodiment 4 exemplifies a power source quality management system (100) in which the load apparatus of the alternating current power source (1) is a combination of one air conditioning apparatus (70) and a lighting device (7).

<Configuration of Power Source Quality Management System>

Figure 4:
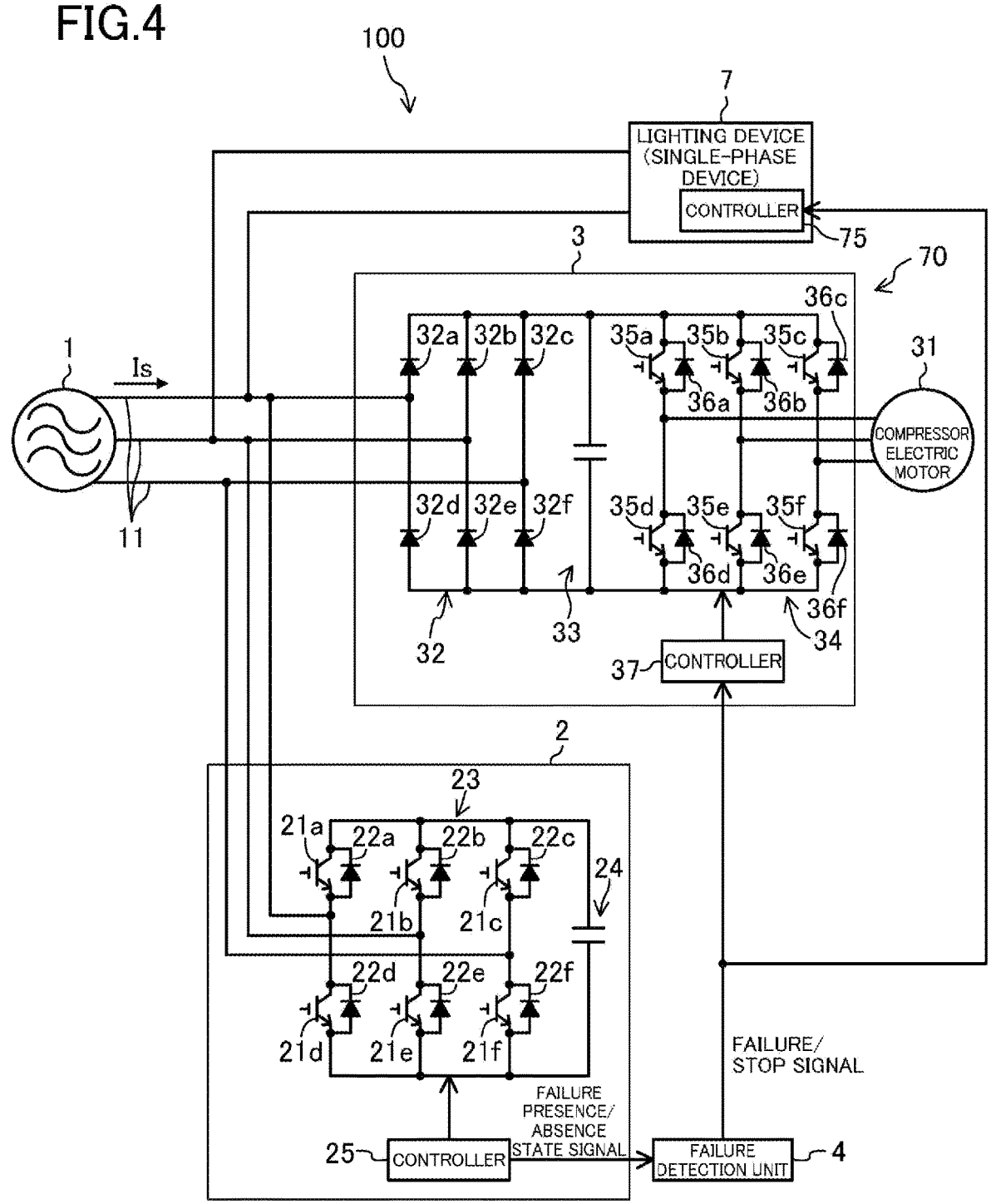
FIG. 4 is a block diagram illustrating a configuration of a power source quality management system according to Embodiment 4.

FIG. 4 is a block diagram illustrating a configuration of a power source quality management system (100) of Embodiment 4.

The power source quality management system (100) includes one air conditioning apparatus (70) and one lighting device (7), which are load apparatuses, an active filter device (2), which is a power source quality improvement unit, a failure detection unit (4), and controllers (37, 75) functioning as an operation limiting unit.

The air conditioning apparatus (70), the lighting device (7), and the active filter device (2) are connected to the alternating current power source (1) via lines (11) so as to be in parallel with each other with respect to the alternating current power source (1).

The air conditioning apparatus (70) and the lighting device (7) operate in response to a power-source electric power being supplied thereto from the alternating current power source (1).

The air conditioning apparatus (70) is configured such that the active filter device (2) and the failure detection unit (4) are removed from the air conditioning apparatus (70) according to Embodiment 1 described above, that is, has a configuration similar to that of the air conditioning apparatuses (70A, 70B) of Embodiment 3. Specifically, the air conditioning apparatus (70) includes a refrigerant circuit (not illustrated) having a compressor and the like, and a power conversion device (3) serving as a harmonic generation load device (corresponding to a harmonic generation unit). Like the power conversion device (3) according to Embodiment 1, the power conversion device (3) includes a rectifier circuit (32) constituted by six diodes (32*a* to 32*0*, a smoothing capacitor (33), an inverter circuit (34) constituted by switching elements (35*a* to 35*f*) and freewheeling diodes (36*a* to 36*0*, and a controller (37) constituted by a CPU and the like and configured to control the switching elements (35*a* to 35*f*) to be turned on or off.

The lighting device (7) is a single-phase device and is installed on a ceiling or the like of a building. The lighting device (7) is constituted by an LED (not illustrated) and a controller (75). The controller (75) is a microcomputer constituted by a CPU and the like and is configured to perform illumination control of the LED (not illustrated).

The active filter device (2) is connected to the alternating current power source (1) to improve the quality of the alternating current power source (1). The active filter device (2) is not contained in the air conditioning apparatus (70), but is installed in advance in the building or the like described above, with the configuration thereof being similar to that of the active filter device (2) of Embodiments 1 and 3 described above. Accordingly, the constituent elements of the active filter device (2) are given numerals similar to those in the Embodiment 1 described above.

The failure detection unit (4) is similar to the failure detection unit (4) according to Embodiment 1 described above. The failure detection unit (4) is connected to the controller (25) of the active filter device (2), the controller (37) of the power conversion device (3), and the controller (75) of the lighting device (7) and is configured to detect the presence or absence of a failure in accordance with a failure presence/absence state signal input from the controller (25).

If the active filter device (2) has failed, the controller (37) of the power conversion device (3) can limit the driving of a compressor electric motor (31) whose drive source is the power conversion device (3) to perform operation limit control to limit the operation of the compressor.

If the active filter device (2) has failed, the controller (75) of the lighting device (7) can perform operation limit control to limit the operation of the lighting device (7) (specifically, the LED included in the lighting device (7)).

<Regarding Operation Limit Control>

The following describes operation limit control according to Embodiment 4 in detail.

In a state where the active filter device (2) has failed or in a state where the active filter device (2) has stopped operation due to the failure, a failure presence/absence state signal indicating the state is output from the controller (25) of the active filter device (2) to the failure detection unit (4). In accordance with the failure presence/absence state signal, the failure detection unit (4) detects a failure of the active filter device (2) or detects stopping of the operation of the active filter device (2) due to the failure. Upon generation of a failure/stop signal indicating the detection result, the failure detection unit (4) outputs the signal to at least one of the controller (37) of the power conversion device (3) included in the air conditioning apparatus (70) and the controller (75) of the lighting device (7).

Upon receipt of the failure/stop signal, the controller (37) of the power conversion device (3) performs control to limit the operation of the air conditioning apparatus (70) so that the power-source current becomes less than or equal to a maximum value of the power-source current, which is obtained in the state where the active filter device (2) is operating without failure. Alternatively, the controller (37) performs control to limit the operation of the air conditioning apparatus (70) so that the power-source electric power becomes less than or equal to a maximum value of the power-source electric power, which is obtained in the state where the active filter device (2) is operating without failure. As an example, the controller (37) reduces the frequency of the alternating current electric power to be output from the power conversion device (3) to reduce the rotational speed of the compressor electric motor (31).

Upon receipt of the failure/stop signal, the controller (75) of the lighting device (7) performs control to reduce the illumination of the lighting device (7) so that the power-source current becomes less than or equal to a maximum value of the power-source current, which is obtained in the state where the active filter device (2) is operating without failure. Alternatively, the controller (75) performs control to reduce the illumination of the lighting device (7) so that the power-source electric power becomes less than or equal to a maximum value of the power-source electric power, which is obtained in the state where the active filter device (2) is operating without failure.

The control described above reduces the occurrence of a phenomenon in which the power-source electric power, which is the sum of electric powers input to the load apparatuses (70, 7), exceeds the capacity of the alternating current power source (1), the capacity of the lines (11), or the like.

When the active filter device (2) is in normal operation, a failure presence/absence state signal indicating the normal operation of the active filter device (2) may be output from the controller (25) of the active filter device (2) to the failure detection unit (4). In this case, the failure detection unit (4) may not output a failure/stop signal to the controllers (37, 75)), or may output to the controllers (37, 75) a failure/stop signal indicating that the active filter device (2) is operating in normal state. In such a case, the operation limit control described above is not performed.

<Advantages>

Embodiment 4, in which the load apparatus is the air conditioning apparatus (70) and the lighting device (7), achieves advantages similar to those of Embodiment 3 described above.

Embodiment 5

Embodiment 5 exemplifies a power source quality management system (100) when the power source quality improvement unit is a phase modifying device (8) and the load apparatus of an alternating current power source (1) is two elevators (9A, 9B). Embodiment 5 also exemplifies a case where a failure of the phase modifying device (8) is not detected, but is determined.

Configuration of Power Source Quality Management System

Figure 5:
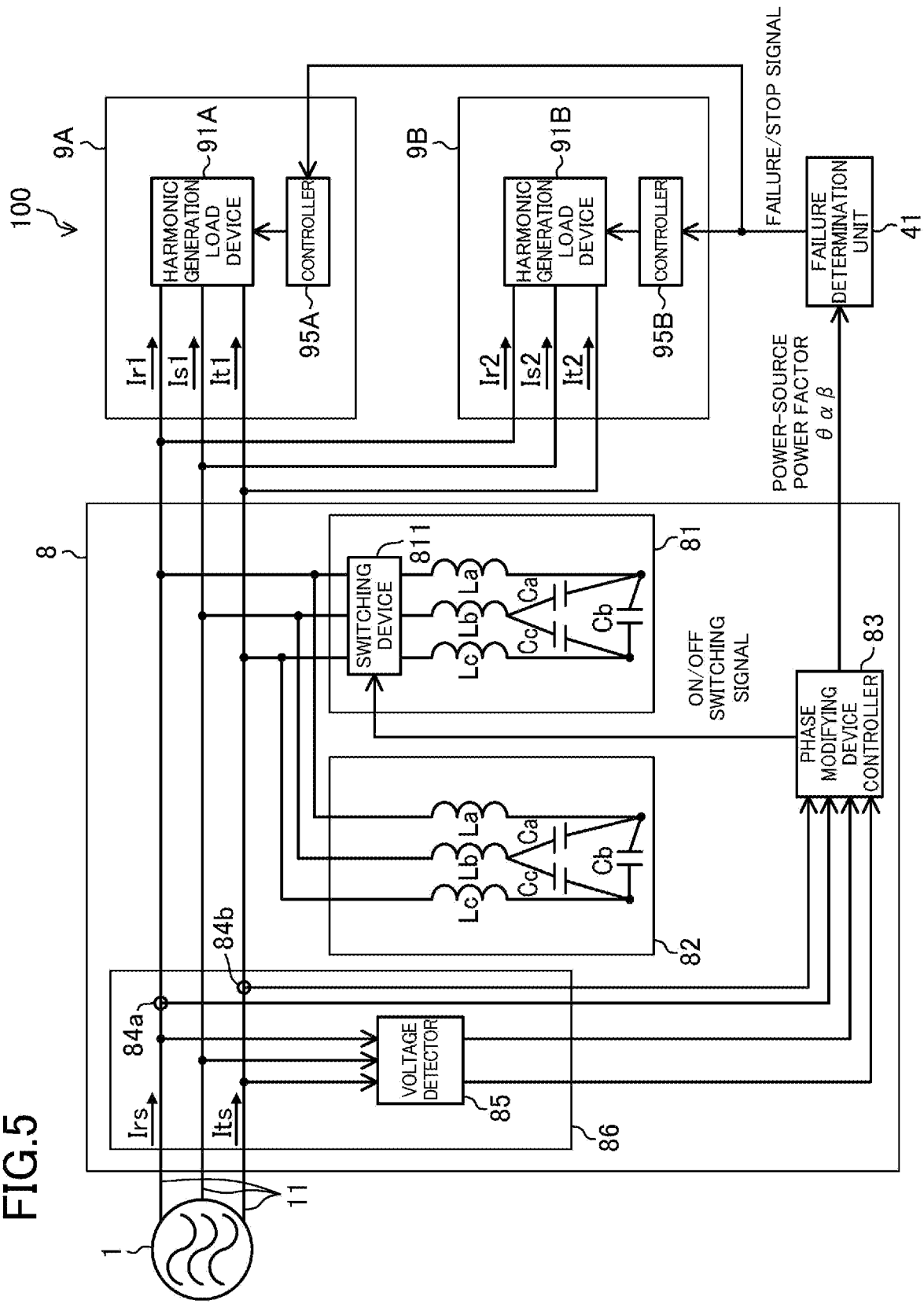
FIG. 5 is a block diagram illustrating a configuration of a power source quality management system according to Embodiment 5.

FIG. 5 is a block diagram illustrating a configuration of a power source quality management system (100) of Embodiment 5.

The power source quality management system (100) includes two elevators (9A, 9B), which are load apparatuses, a phase modifying device (8), which is a power source quality improvement unit, a failure determination unit (41), and controllers (95A, 95B) functioning as an operation limiting unit.

The phase modifying device (8) is a device that is connected to the alternating current power source (1) via lines (11) and is configured to improve the quality of the alternating current power source (1). The elevators (9A, 9B) are connected in parallel with each other with respect to the alternating current power source (1) and operate in response to a power-source electric power being supplied thereto from the alternating current power source (1).

Each of the elevators (9A, 9B) includes a harmonic generation load device (91A, 91B) that generates a harmonic, and the controller (95A, 95B). Each of the harmonic generation load devices (91A, 91B) can be a power conversion device for an inverter circuit, which supplies an electric power to an electric motor (not illustrated) serving as a drive source of the corresponding elevator (9A, 9B).

The phase modifying device (8) includes a phase modifier (82) capable of absorbing a no-load power of 20 kVar, a phase modifier (81) capable of absorbing a no-load power of 50 kVar, a phase modifying device controller (83), and a power source measurement device (86). The phase modifier (82) is constituted by phase advancing capacitors (Ca, Cb, Cc) and phase advancing reactors (La, Lb, Lc). The phase modifier (81) is constituted by phase advancing capacitors (Ca, Cb, Cc), phase advancing reactors (La, Lb, Lc), and a switching device (811). The switching device (811) turns on or off the phase modifier (81) in accordance with an on/off switching signal output from the phase modifying device controller (83). The power source measurement device (86) is constituted by current detectors (84a, 84b) that detect power-source currents (Irs, Its) from the alternating current power source (1), and a voltage detector (85) that detects line-to-line voltages (Vrs, Vst, Vtr) of the power source voltage. That is, the power source measurement device (86) detects the power-source currents (Irs, Its) and the line-to-line voltages (Vrs, Vst, Vtr) as information to be used to calculate a reactive power or a power-source power factor.

The power-source currents (Irs, Its) and the line-to-line voltages (Vrs, Vst, Vtr), which are detected by the power source measurement device (86), are input to the phase modifying device controller (83). The phase modifying device controller (83) calculates an active power Pα and a reactive power Pβ by using the input power-source currents (Irs, Its) and line-to-line voltages (Vrs, Vst, Vtr) in accordance with Equations (1) to (4) below.

[Math. 1]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vrs \\ Vst \\ Vtr \end{bmatrix} \quad (1)$$

$$P\alpha = V\alpha \times i\alpha + V\beta \times i\beta \ldots (3)$$

$$P\beta = V\alpha \times i\beta - V\beta \times i\alpha \ldots (4)$$

[Math. 2]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (2)$$

[Math. 3]

$$P\alpha = V\alpha \times i\alpha + V\beta \times i\beta \quad (3)$$

[Math. 4]

$$P\beta = V\alpha \times i\beta - V\beta \times i\alpha \quad (4)$$

Then, the phase modifying device controller (83) substitutes the calculated active power Pα and reactive power Pβ into Equation (5) below to calculate a power-source power factor θαβ.

[Math. 5]

$$\theta\alpha\beta = \frac{P\alpha}{\sqrt{(P\alpha)^2 + (P\beta)^2}} \quad (5)$$

Equation (5) given above indicates that as the reactive power Pβ increases, the power-source power factor θαβ decreases and that, conversely, as the reactive power Pβ decreases, the power-source power factor θαβ increases (improves). Thus, whereas the phase modifying device controller (83) can use the reactive power Pβ as an on/off switching signal for the phase modifiers (81, 82, the phase modifying device controller (83) uses the power-source power factor θαβ as an on/off switching signal for the phase modifiers (81, 82)), by way of example.

Further, the phase modifying device controller (83) outputs the calculated power-source power factor θαβ to the failure determination unit (41).

The failure determination unit (41) is connected to the phase modifying device controller (83) of the phase modifying device (8) and to the controllers (95A, 95B) of the elevators (9A, 9B). The failure determination unit (41) determines the presence or absence of a failure of the phase modifying device (8) on the basis of the power-source power factor θαβ input from the phase modifying device controller (83). Specifically, the failure determination unit (41) compares the power-source power factor θαβ with a set power factor value (corresponding to a first predetermined value) that is set in advance. If the power-source power factor θαβ is lower than the set power factor value, the failure determination unit (41) determines that the phase modifying device (8) has failed. If the power-source power factor θαβ is not lower than the set power factor value, the failure determination unit (41) determines that the phase modifying device (8) has not failed, but is in normal state.

The set power factor value is preferably set as desired, with consideration given to the specifications of the power source quality management system (100), power source circumstances, and so on.

If the phase modifying device (8) has failed, the controllers (95A, 95B) of the elevators (9A, 9B) perform operation limit control to limit the operation of the elevators (9A, 9B) (specifically, the harmonic generation load devices (91A, 91B) included in the elevators (9A, 9B)).

<Regarding Operation Limit Control>

The following describes operation limit control according to Embodiment 5 in detail.

For example, if the switching device (811) is unable to perform switching to turn on the phase modifiers (81, 82) due to the failure, the power-source power factor θαβ remains reduced. Accordingly, when the power-source power factor θαβ is lower than the set power factor value, the failure determination unit (41) determines that the phase modifying device (8) has failed. A failure/stop signal indicating the determination result is output from the failure determination unit (41) to the controllers (95A, 95B) of the elevators (9A, 9B).

Upon receipt of the failure/stop signal, the controllers (95A, 95B) perform control to limit the operation of the elevators (9A, 9B) so that the power-source current becomes less than or equal to a maximum value of the power-source current, which is obtained in the state where the phase modifying device (8) is operating without failure. Alternatively, the controllers (95A, 95B) perform control to limit the operation of the elevators (9A, 9B) so that the power-source electric power becomes less than or equal to a maximum value of the power-source electric power, which is obtained in the state where the phase modifying device (8) is operating without failure. As an example, the operation of one of the elevators (9A, 9B) is stopped by the corresponding controller (95A, 95B), or, if both the elevators (9A, 9B) are caused to operate, the elevators (9A, 9B) are alternately operated by the controllers (95A, 95B).

The control described above reduces the occurrence of a phenomenon in which the power-source electric power, which is the sum of electric powers input to the elevators (9A, 9B), exceeds the capacity of the alternating current power source (1), the capacity of the lines (11), or the like.

If the phase modifying device (8) is in normal state, the controllers (95A, 95B) do not perform the operation limit control described above.

<Advantages>

Embodiment 5, in which the load apparatus is the elevators (9A, 9B) and the power source quality improvement unit is the phase modifying device (8), achieves advantages similar to those of Embodiment 3 described above.

In particular, the failure determination unit (41) of Embodiment 5 determines that the phase modifying device (8) has failed when the power-source power factor θαβ is lower than the set power factor value. For example, if it is not possible to perform switching to turn on the phase modifiers (81, 82) due to a failure of the phase modifying device (8), the power-source power factor θαβ is decreased. That is, a failure of the phase modifying device (8) affects the power-source power factor θαβ. Accordingly, whether the phase modifying device (8) has failed can be relatively easily determined on the basis of the power-source power factor θαβ.

Embodiment 6

Embodiment 6 exemplifies a case where a failure of the active filter device (2) is determined without using a signal output from the active filter device (2) in the air conditioning apparatus (70) illustrated in FIG. 1.

<Configuration of Air Conditioning Apparatus>

Figure 6:
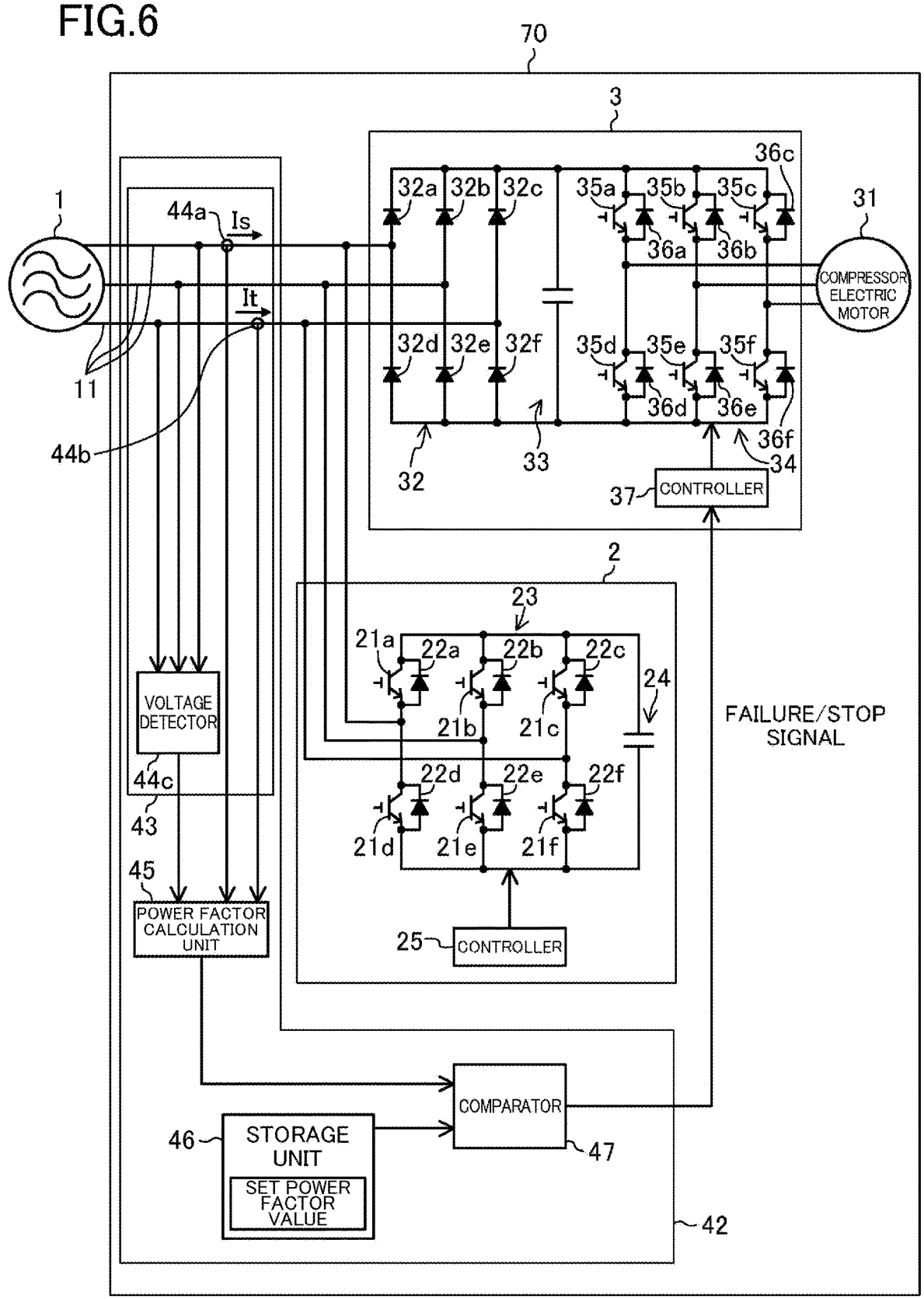
FIG. 6 is a block diagram illustrating a configuration of an air conditioning apparatus according to Embodiment 6.

FIG. 6 is a block diagram illustrating a configuration of an air conditioning apparatus (70) of Embodiment 6.

The air conditioning apparatus (70) according to Embodiment 6 includes a failure determination unit (42) in place of the failure detection unit (4) illustrated in FIG. 1. Other configuration of the air conditioning apparatus (70) according to Embodiment 6 is similar to that of Embodiment 1 described above. In FIG. 6, thus, the components other than the failure determination unit (42) are given numerals similar to those in FIG. 1.

The following describes the failure determination unit (42).

—Failure Determination Unit—

The failure determination unit (42) includes a power source measurement device (43), a power factor calculation unit (45) constituted by a CPU and the like, a storage unit (46) constituted by a semiconductor memory or the like, and a comparator (47) constituted by a semiconductor chip or the like.

The power source measurement device (43) is constituted by current detectors (44a, 44b) that detect two-phase power-source currents (Is, It) from the alternating current power source (1), and a voltage detector (44c) that detects line-to-line voltages (Vrs, Vst, Vtr) of the power source voltage. That is, the power source measurement device (43) detects the power-source currents (Is, It) and the line-to-line voltages (Vrs, Vst, Vtr) as information to be used to compute a reactive power or a power-source power factor.

The power-source currents (Is, It) and the line-to-line voltages (Vrs, Vst, Vtr), which are detected by the power source measurement device (43), are input to the power factor calculation unit (45). The power factor calculation unit (45) calculates an active power Pα and a reactive power Pβ by using the input power-source currents (Is, It) and line-to-line voltages (Vrs, Vst, Vtr) in accordance with Equations (6) to (9) below.

[Math. 6]

$$\begin{bmatrix} V\alpha \\ V\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Vrs \\ Vst \\ Vtr \end{bmatrix} \quad (6)$$

$$P\alpha = V\alpha \times i\alpha + V\beta \times i\beta \ldots (3)$$

$$P\beta = V\alpha \times i\beta - V\beta \times i\alpha \ldots (4)$$

[Math. 7]

$$\begin{bmatrix} i\alpha \\ i\beta \end{bmatrix} = \frac{\sqrt{2}}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} Irs \\ -Irs - Its \\ Its \end{bmatrix} \quad (7)$$

[Math. 8]

$$P\alpha = V\alpha \times i\alpha + V\beta \times i\beta \quad (8)$$

[Math. 9]

$$P\beta = V\alpha \times i\beta - V\beta \times i\alpha \quad (9)$$

Then, the power factor calculation unit (45) substitutes the calculated active power Pα and reactive power Pβ into Equation (10) below to calculate a power-source power factor θαβ.

[Math. 10]

$$\theta\alpha\beta = \frac{P\alpha}{\sqrt{(P\alpha)^2 + (P\beta)^2}} \quad (10)$$

The power factor calculation unit (45) outputs the calculated power-source power factor θαβ to the comparator (47).

The storage unit (46) stores a set power factor value (corresponding to a third predetermined value) that is set in advance. The set power factor value is preferably set as desired, with consideration given to the specifications of the air conditioning apparatus (70), power source circumstances, and so on.

The set power factor value stored in the storage unit (46) is input to the comparator (47) in addition to the calculated power-source power factor θαβ. The comparator (47) compares the power-source power factor θαβ with the set power factor value in terms of magnitude. If the power-source power factor θαβ is lower than the set power factor value, a failure/stop signal indicating that the active filter device (2) has failed is output from the comparator (47) to the controller (37) of the power conversion device (3). If the power-source power factor θαβ is not lower than the set power factor value, a failure/stop signal indicating that the active filter device (2) is in normal state may be output from the comparator (47), or no failure/stop signal may be output from the comparator (47).

<Regarding Operation Limit Control>

Upon receipt of the input of a failure/stop signal indicating that the active filter device (2) has failed, the controller (37) of the power conversion device (3) performs operation limit control to limit the operation of the power conversion device (3).

Specifically, the controller (37) performs control to limit the operation of the power conversion device (3) so that the power-source current becomes less than or equal to a maximum value of the power-source current, which is obtained in the state where the active filter device (2) is operating without failure, to limit the operation of the compressor electric motor (31). Alternatively, the controller (37) performs control to limit the operation of the power conversion device (3) so that the power-source electric power becomes less than or equal to a maximum value of the power-source electric power, which is obtained in the state where the active filter device (2) is operating without failure, to limit the operation of the compressor electric motor (31). As an example, the controller (37) reduces the frequency of the alternating current electric power to be output from the power conversion device (3) to reduce the rotational speed of the compressor electric motor (31), or stops the power conversion device (3) from outputting the alternating current electric power to stop the rotation of the compressor electric motor (31).

The control described above reduces the occurrence of a phenomenon in which the power-source electric power or the like exceeds the capacity of the alternating current power source (1), the capacity of the lines (11), or the like.

<Advantages>

Embodiment 6 achieves advantages similar to those of Embodiment 1 described above.

In particular, the failure determination unit (42) of Embodiment 6 determines that the active filter device (2) has failed when the power-source power factor θαβ is lower than the set power factor value. For example, if the switching elements (21a to 21f) in the active filter device (2) are unable to perform a switching operation due to a failure of the active filter device (2), the power-source power factor θαβ is decreased. That is, a failure of the active filter device (2) affects the power-source power factor θαβ. Accordingly, whether the active filter device (2) has failed can be relatively easily determined on the basis of the power-source power factor θαβ without a direct connection of the failure determination unit (42) to the active filter device (2).

Embodiment 7

Embodiment 7 exemplifies a different configuration of the failure determination unit according to Embodiment 6 illustrated in FIG. 6.

<Configuration of Air Conditioning Apparatus>

Figure 7:
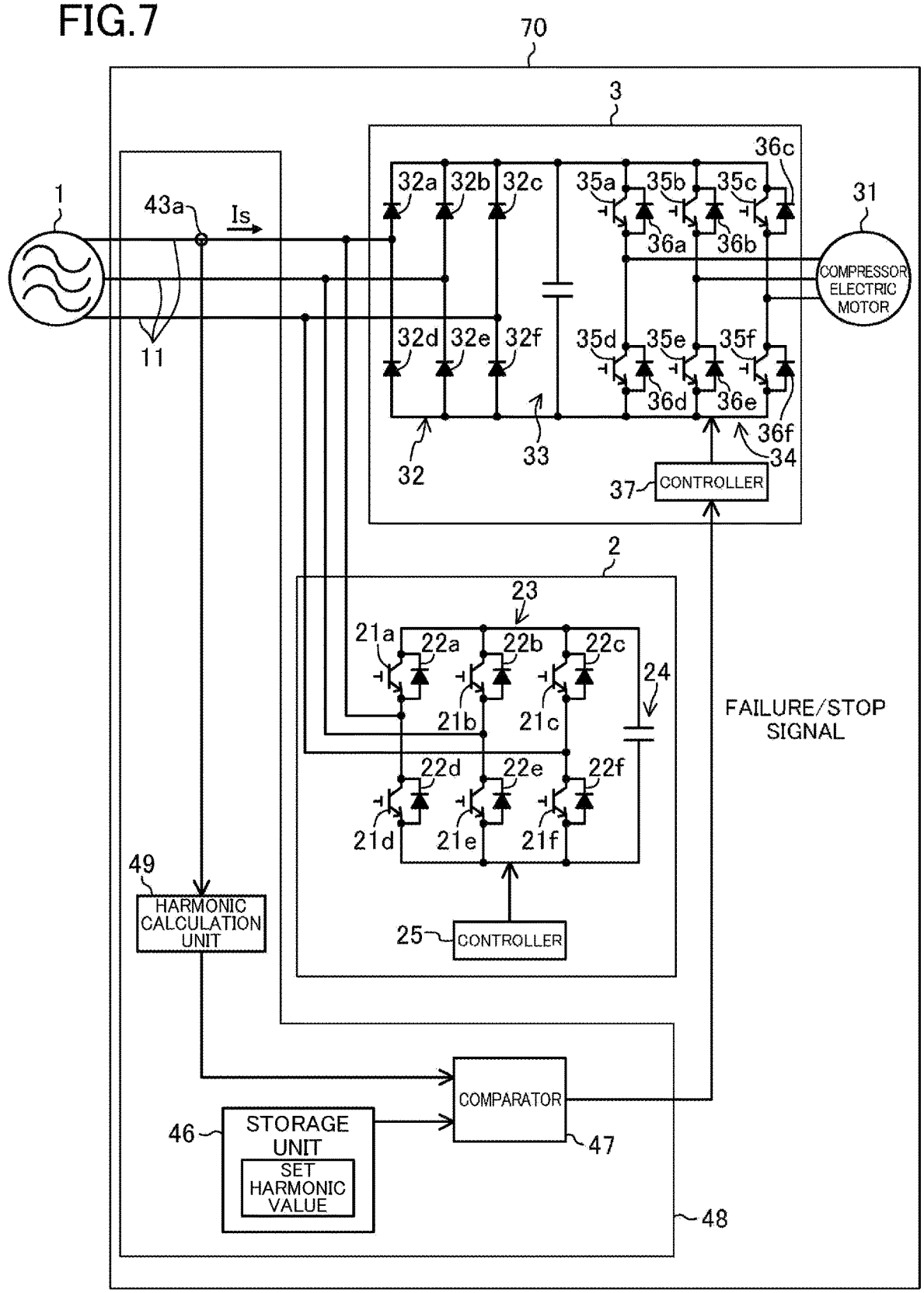
FIG. 7 is a block diagram illustrating a configuration of an air conditioning apparatus according to Embodiment 7.

FIG. 7 is a block diagram illustrating a configuration of an air conditioning apparatus (70) of Embodiment 7.

The air conditioning apparatus (70) according to Embodiment 7 is the same as that of Embodiment 6 described above, except for a failure determination unit (48). In FIG. 7, thus, the components other than the failure determination unit (48) are given numerals similar to those in FIG. 6.

The following describes the failure determination unit (48).

—Failure Determination Unit—

The failure determination unit (48) includes a current detector (43a), a harmonic calculation unit (49) constituted by a CPU and the like, a storage unit (46) constituted by a semiconductor memory or the like, and a comparator (47) constituted by a semiconductor chip or the like.

The current detector (43a) detects a single-phase power-source current (Is) from the alternating current power source (1).

The power-source current (Is) detected by the current detector (43a) is input to the harmonic calculation unit (49). The harmonic calculation unit (49) performs frequency analysis on the input power-source current (Is) and extracts a harmonic component. The harmonic calculation unit (49) outputs the extracted harmonic component to the comparator (47).

The storage unit (46) stores a set harmonic value (corresponding to a fourth predetermined value) that is set in advance. The set harmonic value is preferably set as desired, with consideration given to the specifications of the air conditioning apparatus (70), power source circumstances, and so on.

The set harmonic value stored in the storage unit (46) is input to the comparator (47) in addition to the extracted harmonic component. The comparator (47) compares the harmonic component with the set harmonic value in terms of magnitude. If the harmonic component is greater than the set harmonic value, a failure/stop signal indicating that the active filter device (2) has failed (is malfunctioning) is output from the comparator (47) to the controller (37) of the power conversion device (3). If the harmonic component is not greater than the set harmonic value, a failure/stop signal indicating that the active filter device (2) is in normal state may be output from the comparator (47), or no failure/stop signal may be output from the comparator (47).

<Regarding Operation Limit Control>

Upon receipt of the input of a failure/stop signal indicating that the active filter device (2) has failed (is malfunctioning), the controller (37) of the power conversion device (3) performs operation limit control similar to that in Embodiment 6 to limit the operation of the power conversion device (3).

That is, the controller (37) limits the operation of the power conversion device (3) so that the power-source current or the power-source electric power obtained in the state where the active filter device (2) has failed does not exceed its maximum value. This reduces the occurrence of a phenomenon in which the power-source electric power or the like exceeds the capacity of the alternating current power source (1), the capacity of the lines (11), or the like.

<Advantages>

Embodiment 7 achieves advantages similar to those of Embodiment 1 described above.

In particular, the failure determination unit (48) of Embodiment 7 determines that the active filter device (2) has failed when the harmonic component of the power-source current (Is) is greater than the set harmonic value. For example, if the switching elements (21a to 21f) in the active filter device (2) are unable to perform a switching operation due to a failure of the active filter device (2), the harmonic component is increased. In this manner, a failure of the active filter device (2) affects the harmonic component. Accordingly, whether the active filter device (2) has failed can be relatively easily determined on the basis of the harmonic component without a direct connection of the failure determination unit (48) to the active filter device (2).

Embodiment 8

Embodiment 8 exemplifies a different configuration of the failure determination unit (48) in the air conditioning apparatus (70) illustrated in FIG. 7.

<Configuration of Air Conditioning Apparatus>

Figure 8:
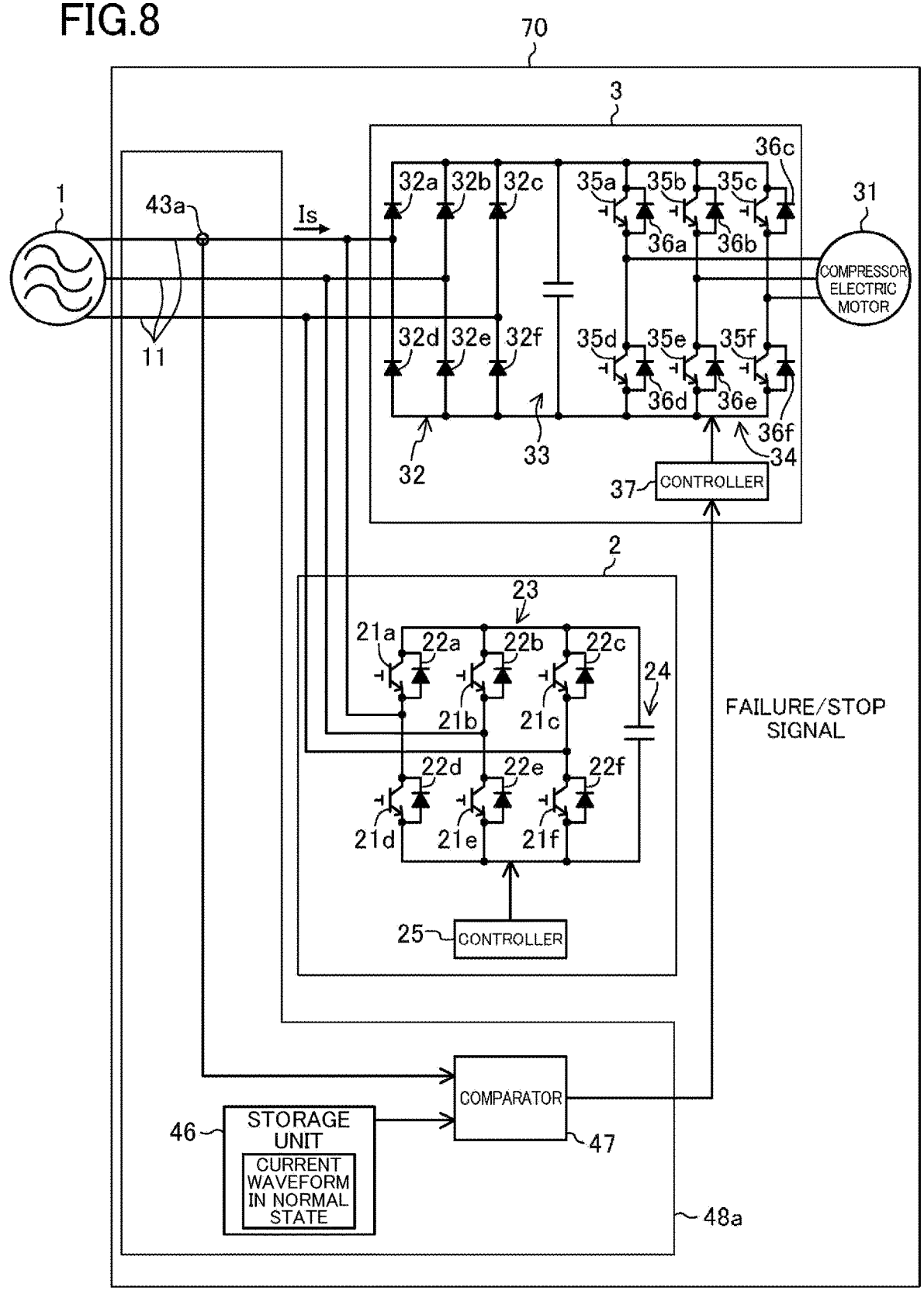
FIG. 8 is a block diagram illustrating a configuration of an air conditioning apparatus according to Embodiment 8.

FIG. 8 is a block diagram illustrating a configuration of an air conditioning apparatus (70) of Embodiment 8.

The air conditioning apparatus (70) according to Embodiment 8 is the same as that of Embodiments 6 and 7 described above, except for a failure determination unit (48a). In FIG. 8, thus, the components other than the failure determination unit (48a) are given numerals similar to those in FIGS. 6 and 7.

The following describes the failure determination unit (48a).

—Failure Determination Unit—

The failure determination unit (48a) includes a current detector (43a), a storage unit (46) constituted by a semiconductor memory or the like, and a comparator (47) constituted by a semiconductor chip or the like.

The current detector (43a) detects a single-phase power-source current (Is) from the alternating current power source (1). The detected power-source current (Is) is sequentially input to the comparator (47).

The storage unit (46) stores a waveform of the power-source current (Is) obtained in the state where the active filter device (2) has not failed, but is in normal state. The waveform is preferably detected by the current detector (43a) and stored in the storage unit (46) while the active filter device (2) is in normal state.

The waveform of the power-source current (Is) obtained when the active filter device (2) is in normal state and stored in the storage unit (46) is input to the comparator (47), in addition to the power-source current (Is) detected by the current detector (43a). The comparator (47) compares the waveform of the power-source current (Is) detected by the current detector (43a) with the waveform of the power-source current (Is) obtained when the active filter device (2) is in normal state. If the waveform of the power-source current (Is) detected by the current detector (43a) is different from the waveform of the power-source current (Is) obtained when the active filter device (2) is in normal state, a failure/stop signal indicating that the active filter device (2) has failed (is malfunctioning) is output from the comparator (47) to the controller (37) of the power conversion device (3). If the waveform of the power-source current (Is) detected by the current detector (43a) coincides with the waveform of the power-source current (Is) obtained when the active filter device (2) is in normal state, a failure/stop signal indicating that the active filter device (2) is in normal state may be output from the comparator (47), or no failure/stop signal may be output from the comparator (47).

The failure determination unit (48a) may determine whether the waveform of the power-source current (Is) detected by the current detector (43a) coincides with the waveform of the power-source current (Is) obtained when the active filter device (2) is in normal state, in accordance with whether the degree to which these waveforms coincide with each other is less than or equal to a predetermined amount.

<Regarding Operation Limit Control>

Upon receipt of the input of a failure/stop signal indicating that the active filter device (2) has failed (is malfunctioning), the controller (37) of the power conversion device (3) performs operation limit control similar to that in Embodiments 6 and 7 described above to limit the operation of the power conversion device (3).

That is, the controller (37) limits the operation of the power conversion device (3) so that the power-source current or the power-source electric power obtained in the state where the active filter device (2) has failed does not exceed its maximum value. This reduces the occurrence of a phenomenon in which the power-source electric power or the like exceeds the capacity of the alternating current power source (1), the capacity of the lines (11), or the like.

<Advantages>

Embodiment 8 achieves advantages similar to those of Embodiment 1 described above.

In particular, if the active filter device (2) has failed, the power-source power factor deteriorates. The deterioration of the power-source power factor distorts the waveform of the power-source current (Is) to be output from the alternating current power source (1). The failure determination unit (48a) according to Embodiment 8 determines that the active filter device (2) has failed when the waveform of the power-source current (Is) is different from the waveform of the power-source current (Is) obtained when the active filter device (2) is in normal state. Accordingly, a failure of the active filter device (2) can be easily determined without a direct connection of the failure determination unit (48a) to the active filter device (2).

OTHER EMBODIMENTS

In Embodiments 3 to 8 described above, the power source quality improvement unit may be a PWM converter device in place of the active filter device (2) or the phase modifying device (8).

In Embodiments 5 and 6 described above, the reactive power Pβ and the power-source power factor θαβ are determined by calculation; however, these may be directly measured.

Embodiment 5 described above exemplifies a case where the presence or absence of a failure of the power source quality improvement unit (specifically, the phase modifying device (8)) is determined on the basis of the power-source power factor θαβ. However, the presence or absence of a failure may be determined by using the method described in Embodiment 7 or 8, that is, a method of comparing the power-source harmonic with the set harmonic value or a method of comparing the waveform of the power-source current with the waveform of that obtained in normal state.

In Embodiments 3 to 5 described above, the power source quality improvement unit (2, 8) may be incorporated in the load apparatus (70A, 70B, 70, 7, 9A, 9B).

In Embodiments 6 to 8 described above, the power source quality improvement unit is not limited to the active filter device (2), but may be a PWM converter device.

In Embodiments 1 to 8 described above, any other load apparatus (not illustrated) may further be connected to the alternating current power source (1). In this case, the other load apparatus may also be subjected to operation limit control.

While Embodiments 1 to 4 and 6 to 8 described above exemplify a case where the target to be driven by the power conversion device (3, 3A, 3B) or the inverter device (6) is the compressor electric motor (31, 31A, 31B), the target to be driven is not limited thereto.

While embodiments and modifications have been described, it will be understood that various changes in the form or in the details may be made without departing from the spirit and scope of the claims. In addition, the foregoing embodiments and modifications may be combined or replaced, as desired, as long as the target functions of the present disclosure are not impaired.

INDUSTRIAL APPLICABILITY

As described above, the present disclosure is suitable for use as a power source quality management system and a power conversion device.

REFERENCE SIGNS LIST

1 alternating current power source (power source)
2 active filter device (power source quality improvement unit)
3, 3A, 3B power conversion device (harmonic generation unit)
4 failure detection unit (failure determination unit)
5 PWM converter device (power source quality improvement unit)
6 inverter device (harmonic generation unit)
7 lighting device (load apparatus)
37, 37A, 37B, 75 controller (operation limiting unit)
41, 42, 48, 48a failure determination unit
70, 70A, 70B air conditioning apparatus (load apparatus)
100 power source quality management system

The invention claimed is:

1. A power source quality management system comprising:
    a load apparatus that includes
        a harmonic generator from which a power-source harmonic is generated and outputs an alternating current electric power, the harmonic generator being connected to a power source and supplied with a power-source electric power from the power source, and
        an electric motor that operates in response to the alternating current electric power being output from the harmonic generator;
    a power source modifier that is connected to the power source and improves a quality of the power source;
    a processor that determines a presence or absence of a failure of the power source modifier; and
    a controller that makes the load apparatus continue operating in a state limited more than when no failure has occurred in the power source modifier, so that any one of the power-source electric power, a power-source current, and a power-source harmonic becomes less than or equal to a maximum value of a corresponding one of the power-source electric power, the power-source current, and the power-source harmonic by reducing the frequency of the alternating current electric power to be output from the harmonic generator to the electric motor to reduce the rotation speed of the electric motor in response to a determination by the processor that the power source modifier has failed, the maximum value being obtained when no failure has occurred in the power source modifier.

2. The power source quality management system according to claim 1, wherein
    the power source modifier is any one of a PWM converter device, an active filter device, and a phase modifying device.

3. The power source quality management system according to claim 2, wherein
    the load apparatus is any one of an air conditioning apparatus, an elevator, and a lighting device.

4. The power source quality management system according to claim 3, wherein
    the processor determines that the power source modifier has failed when a power-source power factor of the power source is lower than a first predetermined value.

5. The power source quality management system according to claim 3, wherein
    the processor determines that the power source modifier has failed when the power-source harmonic is greater than a second predetermined value.

6. The power source quality management system according to claim 2, wherein
    the processor determines that the power source modifier has failed when a power-source power factor of the power source is lower than a first predetermined value.

7. The power source quality management system according to claim 2, wherein
    the processor determines that the power source modifier has failed when the power-source harmonic is greater than a second predetermined value.

8. The power source quality management system according to claim 2, wherein
    the processor determines that the power source modifier has failed when the power-source current from the power source has a waveform different from a waveform of the power-source current that is obtained in a state where no failure has occurred in the power source modifier.

9. The power source quality management system according to claim 1, wherein
    the load apparatus is any one of an air conditioning apparatus, an elevator, and a lighting device.

10. The power source quality management system according to claim 9, wherein
    the processor determines that the power source modifier has failed when a power-source power factor of the power source is lower than a first predetermined value.

11. The power source quality management system according to claim 9, wherein
    the processor determines that the power source modifier has failed when the power-source harmonic is greater than a second predetermined value.

12. The power source quality management system according to claim 1, wherein
    the processor determines that the power source modifier has failed when a power-source power factor of the power source is lower than a first predetermined value.

13. The power source quality management system according to claim 1, wherein
the processor determines that the power source modifier has failed when the power-source harmonic is greater than a second predetermined value.

14. The power source quality management system according to claim 1, wherein
the processor determines that the power source modifier has failed when the power-source current from the power source has a waveform different from a waveform of the power-source current that is obtained in a state where no failure has occurred in the power source modifier.

15. The power source quality management system according to claim 1, wherein
the power source modifier is incorporated in the load apparatus.

16. An air conditioning apparatus comprising:
a harmonic generator from which a power-source harmonic is generated and outputs an alternating current electric power, the harmonic generator being connected to a power source and supplied with a power-source electric power from the power source;
an electric motor that operates in response to the alternating current electric power being output from the harmonic generator;
a power source modifier that is connected in parallel with the harmonic generator with respect to the power source and improves a quality of the power source;
a processor that determines a presence or absence of a failure of the power source modifier; and
a controller that makes the harmonic generator continue operating in a state limited more than when no failure has occurred in the power source modifier, so that any one of the power-source electric power, a power-source current, and the power-source harmonic becomes less than or equal to a maximum value of a corresponding one of the power-source electric power, the power-source current, and the power-source harmonic by reducing the frequency of the alternating current electric power to be output from the harmonic generator to the electric motor to reduce the rotation speed of the electric motor in response to a determination by the processor that the power source modifier has failed, the maximum value being obtained when no failure has occurred in the power source modifier.

17. The air conditioning apparatus according to claim 16, wherein
the power source modifier is any one of an active filter and a PWM converter.

18. The air conditioning apparatus according to claim 16, wherein
the processor determines that the power source modifier has failed when a power-source power factor of the power source is lower than a third predetermined value.

19. The air conditioning apparatus according to claim 16, wherein
the processor determines that the power source modifier has failed when the power-source harmonic is greater than a fourth predetermined value.

20. The air conditioning apparatus according to claim 16, wherein
the processor determines that the power source modifier has failed when the power-source current from the power source has a waveform different from a waveform of the power-source current that is obtained in a state where no failure has occurred in the power source modifier.

* * * * *